United States Patent [19]

Pfannebecker

[11] Patent Number: 5,788,279
[45] Date of Patent: Aug. 4, 1998

[54] STEERING BEARING FOR MOTOR VEHICLE

[75] Inventor: Gunter Pfannebecker, Russelsheim, Germany

[73] Assignee: Genernal Motors Corporation, Detroit, Mich.

[21] Appl. No.: 861,041

[22] Filed: May 21, 1997

[30] Foreign Application Priority Data

Jun. 18, 1996 [DE] Germany .......................... 196 24 218.5

[51] Int. Cl.[6] ........................................................ B62D 1/19
[52] U.S. Cl. .................................................. 280/707; 74/492
[58] Field of Search .................................. 280/777, 775; 74/492, 493

[56] References Cited

U.S. PATENT DOCUMENTS

| | | | |
|---|---|---|---|
| 5,390,955 | 2/1995 | Kaliszewski et al. | 280/777 |
| 5,704,254 | 1/1998 | Thomas et al. | 74/462 |
| 5,704,641 | 1/1998 | Shimizu et al. | 280/775 |

FOREIGN PATENT DOCUMENTS

| | | |
|---|---|---|
| 0 295 378 B1 | 7/1992 | European Pat. Off. . |
| GM 1 987 550 | 6/1968 | Germany . |
| OS 1 913 054 | 2/1970 | Germany . |
| OS 1 936 994 | 2/1971 | Germany . |
| OS 2 365 063 | 7/1974 | Germany . |
| OS 27 01 037 | 7/1977 | Germany . |
| GM 79 02 092 | 2/1978 | Germany . |
| 43 39 429 A1 | 5/1995 | Germany . |

*Primary Examiner*—Paul N. Dickson
*Attorney, Agent, or Firm*—Saul Schwartz

[57] ABSTRACT

A steering bearing between a bracket on a steering column tube and a support on a body of a motor vehicle. The bracket has a slot therein and the steering bearing includes a metal bearing bottom having a rest surface bearing flush against a first side of the bracket and a raised rest in the slot with a second side of the bracket and a collar raised above the raised rest, an elongated slot through the metal bearing bottom, a fastening bolt on the support passing through the elongated slot and clamping the metal bearing bottom against the support, a plastic insert rigidly attached to the bearing bottom seated flush on the raised rest having a tear-off surface which cooperates with the rest surface on the metal bearing bottom in defining a slot for the bracket on the steering column tube, an aperture in the bracket on the steering column tube, and a tear-off body integral with the tear-off surface received in the aperture in the bracket to retain the bracket relative to the plastic insert. The tear-off body fractures in response to an impact on the steering column tube to release the bracket from the steering bearing.

4 Claims, 4 Drawing Sheets

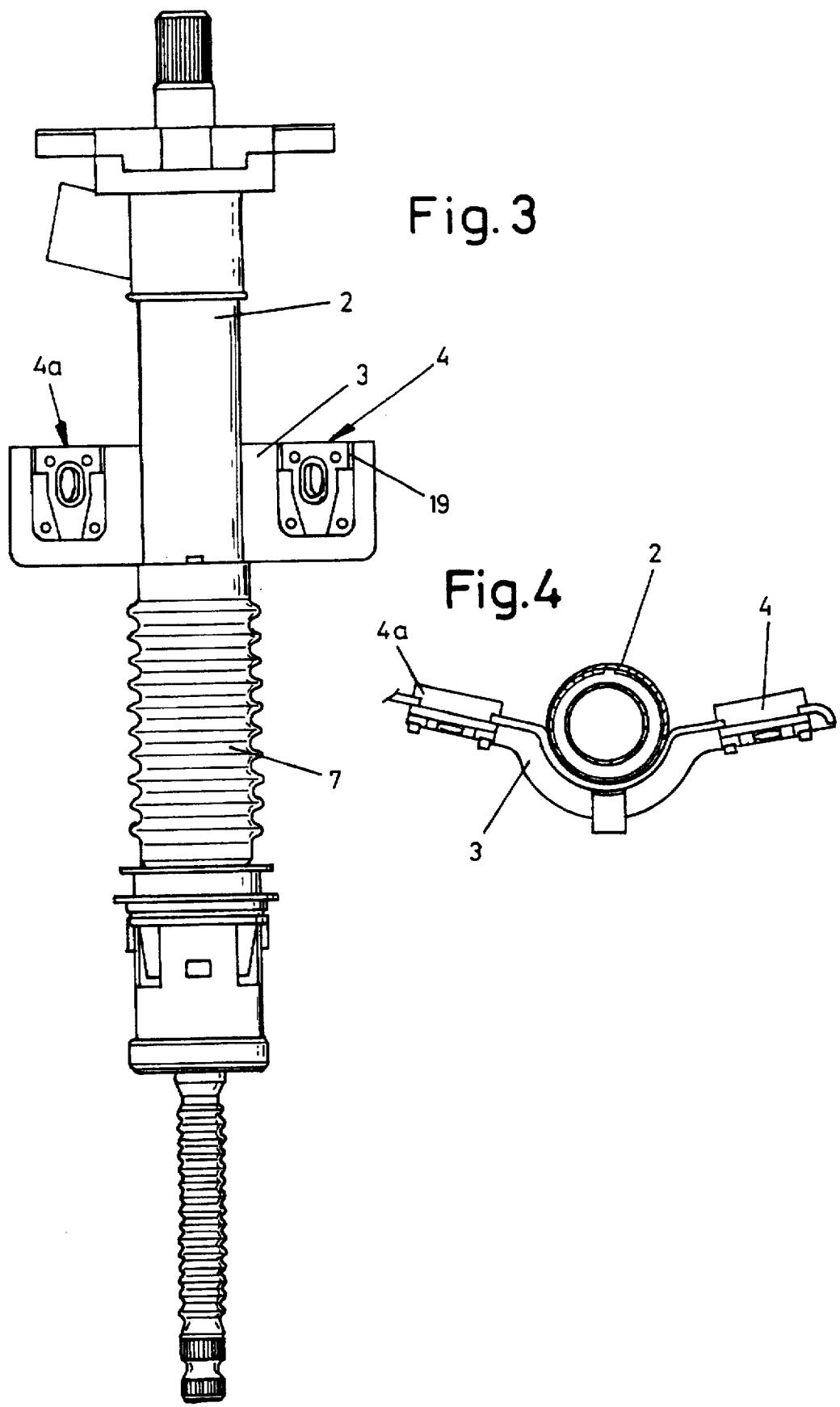

STEERING BEARING FOR MOTOR VEHICLE

FIELD OF THE INVENTION

This invention relates to an attachment between a motor vehicle body structure and a steering column tube of an energy absorbing steering column of the motor vehicle.

BACKGROUND OF THE INVENTION

European Patent EP-B-0 295 378 describes an energy absorbing attachment between a motor vehicle body structure and a steering column tube of a steering column of the motor vehicle including an energy-absorbing plate consisting of different materials in order to achieve a defined deformation and/or tear-out behavior in response to an impact on the steering column. As a result of the deformation of the inserted part, the steering wheel yields in the direction of the engine compartment. An energy absorbing attachment between a motor vehicle body structure and a steering column tube of a steering column of the motor vehicle described in German patent DE-A-4339429 includes a U-shaped clamping part which is plastically deformed or sheared off in response to an impact on the steering column tube.

SUMMARY OF THE INVENTION

This invention is a new and improved steering bearing between a bracket on a steering column tube and a support on a body of a motor vehicle. The bracket has a slot therein and the steering bearing includes a metal bearing bottom having a rest surface bearing flush against a first side of the bracket and a raised rest in the slot with a second side of the bracket and a collar raised above the raised rest, an elongated slot through the metal bearing bottom traversing each of the rest surface and the raised rest and the collar, a fastening bolt on the support on the body of the motor vehicle passing through the elongated slot and clamping the metal bearing bottom against the body of the motor vehicle, a plastic insert rigidly attached to the bearing bottom seated flush on the raised rest having a tear-off surface which cooperates with the rest surface on the metal bearing bottom in defining a slot in the steering bearing for the bracket on the steering column tube, an aperture in the bracket on the steering column tube, and a tear-off body integral with the tear-off surface on the plastic insert received in the aperture in the bracket on the steering column tube to retain the bracket relative to the plastic insert. The tear-off body fractures in response to an impact on the steering column tube to release the bracket on the steering column tube from the steering bearing.

BRIEF DESCRIPTION OF THE DRAWINGS

The invention can be represented in numerous versions, one of which is shown in the drawing and is described in the following, showing:

FIG. 3 a top view of a steering system with a steering bracket and two steering bearings, FIG. 4 a cross section through the steering system, FIG. 5 a top view of the region of the steering bearing, FIG. 6 a side view of a bearing bottom of a steering bearing, FIG. 7 a top view of a bearing bottom, FIG. 8 a front view of the bearing bottom, FIG. 9 a view from below at the insert part of the steering bearing, FIG. 10 a side view of the inserted part, and FIG. 11 a view at the inserted part from below.

DESCRIPTION OF THE PREFERRED EMBODIMENT

Figure 1:
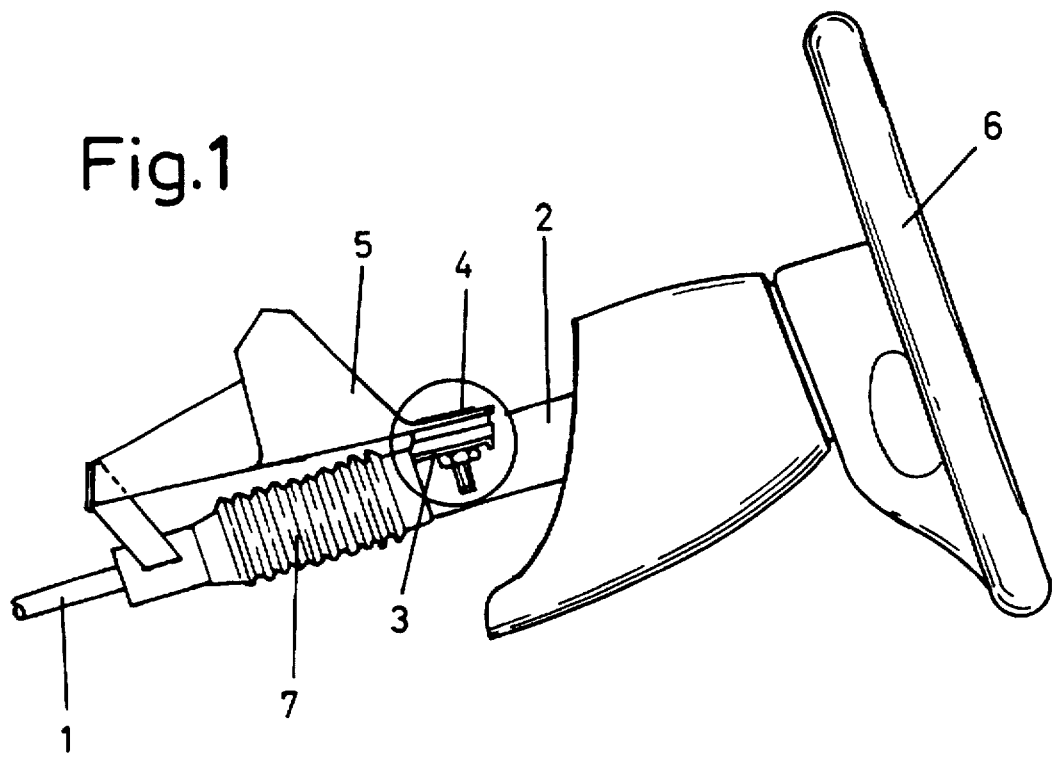
FIG. 1 a side view of a steering system according to the invention.

FIG. 1 shows a steering column 1 which is rotatably arranged in a steering protective tube. This steering protective tube 2 is connected by a steering bracket 3 via two steering bearings 4 to a steering support 5, it being important for the invention that this connection disengage under a defined force. On the cabin side end of the steering column 1, a conventional steering wheel 6 is arranged. Also conventional is an absorber 7 which serves in modern motor vehicles to make it possible for the steering system to collapse so that it does not penetrate into the passenger compartment when exposed to an outside force.

Important for the invention is the configuration of the steering bearing 4 which is explained in the following with reference to FIG. 2. There partial regions of the steering support 5 and the steering bracket 3 are shown. A fastening bolt 8 connects these parts with each other. It passes for this purpose through bearing bottom 9 and an inserted part 10 of plastic. The steering bracket 3 sits between the bearing bottom 9 and the inserted part 10 in a slot 13. One recognizes in FIG. 2 a tear-off body 11 designed as a downwardly directed pin on the inserted part 10 which leads through a boring 12 in the steering bracket 3 and is formed at its free end as a clip 14. In the tear-off body 11, a dead end boring 31 is provided for reducing or for the exact specification of the shearing forces.

Figure 2:
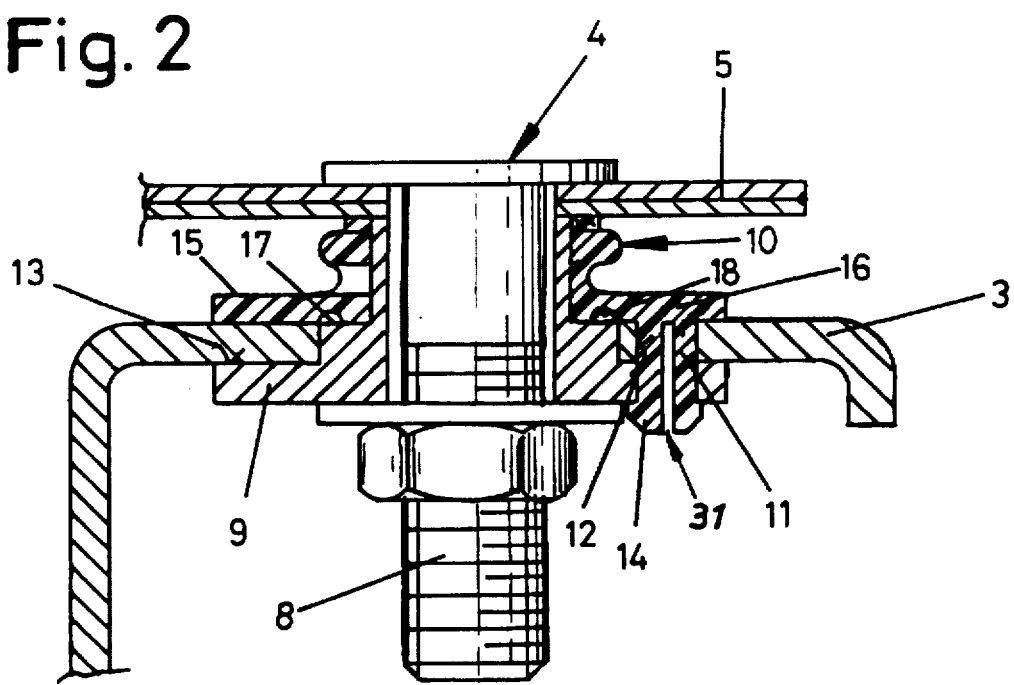
FIG. 2 a vertical section through the region of a steering bracket.

FIG. 2 also shows that the inserted part 10 with tear-off surfaces 15, 16 is seated from above on the steering bracket 3. The tear-off surfaces 15, 16 on their bottom side are in each case connected via a nominal failure groove 17, 18 to the remaining region of the inserted part 10.

In FIG. 3, the steering bracket 3 extends on both sides of the steering protective tube 2 and has on each side a steering bearing 4, 4A. The latter in each case sits in a recess 19 on the steering bracket 3 which is open toward the side of the steering wheel 6 shown in FIG. 1, therefore open at the top in FIG. 3.

FIG. 4 illustrates the fact that the steering bracket 3 like a tube clamp partly surrounds or embraces the bottom side of the steering protective tube 2. Also recognizable in FIG. 4 are the two steering bearings 4, 4A.

Figure 5:
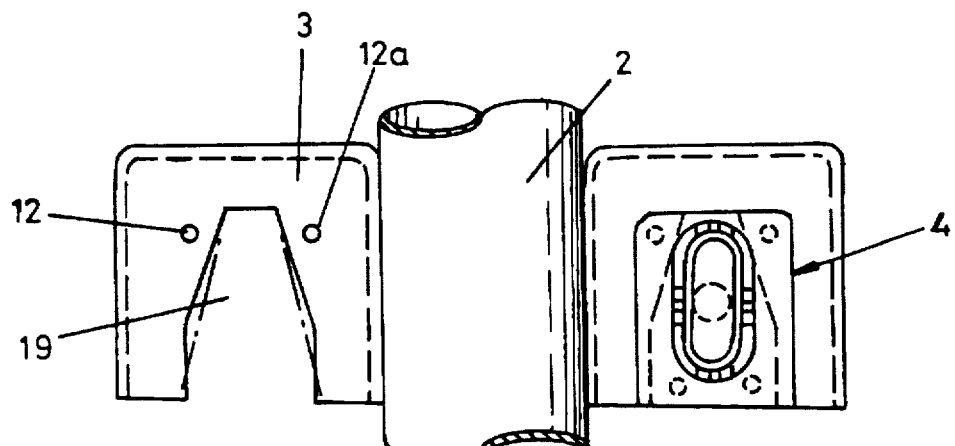

In FIG. 5, the steering bracket 3 is shown in the left part of the figure without and in the right part with the steering bearing 4. In the left part of the figure one therefore recognizes that the recess 19 tapers in width towards the engine compartment side and is open toward the passenger compartment. Near its end facing away from the steering wheel 6 one recognizes on the left of the recess 19 the boring 12 and to its right another boring 12A. Through these borings 12,12A after the installation of the steering bearing 4, in each case a tear-off body 11 already shown in FIG. 2 is guided.

Figure 6:
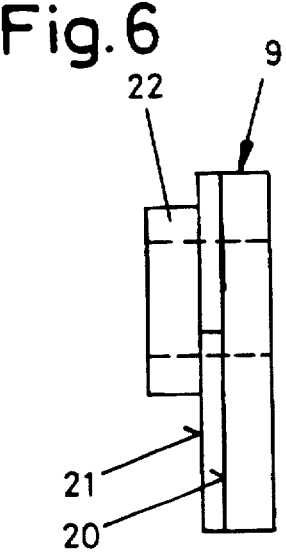
Figure 7:
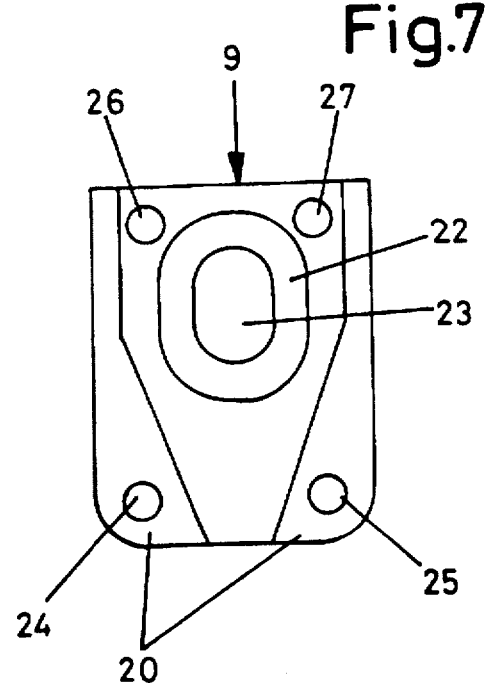
Figure 8:
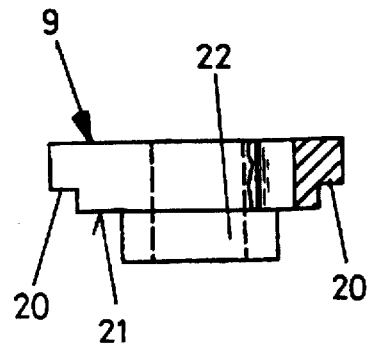

The exact configuration of the bearing bottom 9 is obtained from FIGS. 6 through 8. The bearing bottom 9 has on its two long sides a rest surface 20 on which the steering bracket 3 rests. Offset in height to this runs a rest 21 on which the inserted part 10 is seated after assembly. In addition, the bearing bottom 9 is provided with a collar 22 which penetrates fully into the inserted part 10 and in the installed state lies closely against the steering support 5. Through this collar 22 a passage 23 designed as an elongated hole passes, through which the fastening bolt 8 passes after assembly. The rest surface 20 has two borings 24, 25 which are engaged by tear-off body 11 in each case. Also in the rest 21 two borings 26, 27 are provided.

Figure 9:
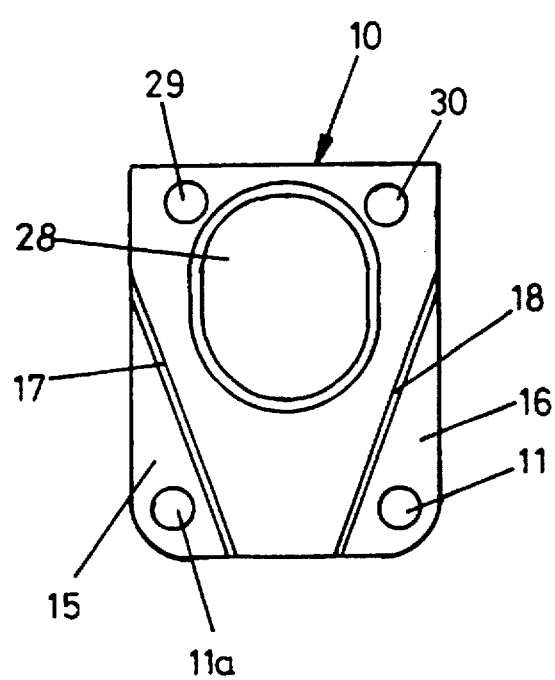
Figure 10:
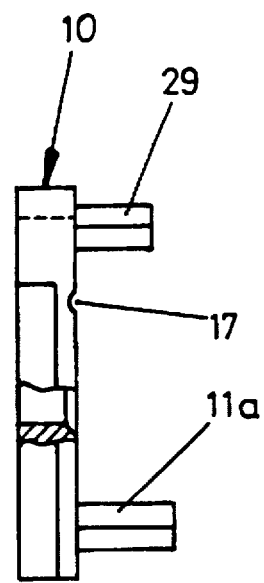
Figure 11:
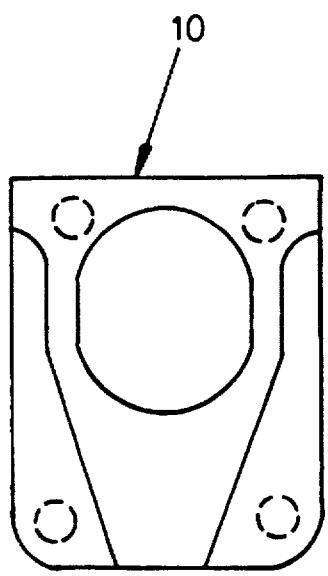

FIGS. 9, 10 and 11 illustrate the design of the inserted part 10. FIG. 9 reveals especially the tear-off surfaces 15, 16 in each case with nominal failure grooves 17, 18. These tear-off surfaces 15, 16 are in each case provided with one of the tear-off bodies 11, 11A. A perforation or interruption 28 passes through the inserted part 10 which corresponds to the passage 23 in the bearing bottom 9. In addition to the tear-off bodies 11, 11A, the inserted part 10 has two holding pins 29, 30 which engage the borings 26, 27 of the bearing bottom 9 directly, therefore cannot pass through the steering bracket 3.

What is claimed is:

1. A steering bearing between a bracket on a steering column tube and a support on a body of a motor vehicle comprising:

a slot in the bracket on the steering column tube, a metal bearing bottom having a rest surface bearing flush against a first side of the bracket and a raised rest in the slot in the bracket even with a second side of the bracket and a collar raised above the raised rest, an elongated slot through the metal bearing bottom traversing each of the rest surface and the raised rest and the collar, a fastening bolt on the support on the body of the motor vehicle passing through the elongated slot in the metal bearing bottom and clamping the metal bearing bottom against the body of the motor vehicle, a plastic insert seated flush on the raised rest on the metal bearing bottom having a tear-off surface which cooperates with the rest surface on the metal bearing bottom in defining a slot in the steering bearing for the bracket on the steering column tube, means operative to rigidly connect the plastic insert directly to the metal bearing bottom, an aperture in the bracket on the steering column tube, a tear-off body integral with the tear-off surface on the plastic insert received in the aperture in the bracket on the steering column tube to retain the bracket relative to the plastic insert, and means operative to fracture one of the tear-off body from the tear-off surface and the tear-off surface from the plastic insert in response to an impact on the steering column tube thereby to release the bracket on the steering column tube from the steering bearing.

2. The steering bearing recited in claim 1 wherein the tear-off body comprises:

an integral cylindrical pin perpendicular to the tear-off surface closely received in the aperture in the bracket in the steering column and an aperture in the metal bearing bottom aligned with the aperture in the bracket in the steering column tube, and an integral clip on the cylindrical pin engageable on the metal bearing bottom for retention of the cylindrical pin in each of the apertures in the bearing bottom and in the bracket in the steering column tube.

3. The steering bearing recited in claim 2 wherein the means operative to fracture one of the tear-off body from the tear-off surface and the tear-off surface from the plastic insert in response to an impact on the steering column tube comprises:

a dead-end bore in the cylindrical pin reducing the thickness of the cylindrical pin.

4. The steering bearing recited in the claim 1 wherein the means operative to fracture one of the tear-off body from the tear-off surface and the tear-off surface from the plastic insert in response to an impact on the steering column tube comprises:

a nominal failure groove in the plastic insert between tear-off surface and a remaining portion of the plastic insert.

* * * * *